J. C. NICHOLSON.
CUT-OFF ATTACHMENT FOR LATHES.
APPLICATION FILED DEC. 13, 1919.

1,373,258.

Patented Mar. 29, 1921.
6 SHEETS—SHEET 1.

Inventor
J.C. Nicholson

By Wilkinson & Giusta
Attorneys

J. C. NICHOLSON.
CUT-OFF ATTACHMENT FOR LATHES.
APPLICATION FILED DEC. 13, 1919.

1,373,258.

Patented Mar. 29, 1921
6 SHEETS—SHEET 6.

UNITED STATES PATENT OFFICE.

JAMES CALVIN NICHOLSON, OF ORLANDO, FLORIDA.

CUT-OFF ATTACHMENT FOR LATHES.

1,373,258.  Specification of Letters Patent.  Patented Mar. 29, 1921.

Application filed December 13, 1919. Serial No. 344,687.

*To all whom it may concern:*

Be it known that I, JAMES CALVIN NICHOLSON, a citizen of the United States, residing at Orlando, in the county of Orange and State of Florida, have invented certain new and useful Improvements in Cut-Off Attachments for Lathes; and I do hereby declare the following to be a full, clear, and exact description of the the invention, such as will enable others skilled in the art to which it appertains to make and use the same.

The present invention relates to improvements in cut-off attachments for lathes and the like, and the object thereof is to employ two tools, one of which is the usual tool for cutting through the stock and the other tool is arranged to cut deeper into the groove in the metal stock formed by the first mentioned tool for the purpose of splitting the chip formed by the first mentioned tool and preventing such chip binding in the groove, which is a source of great trouble at the present time.

Machinists experience great difficulty, after finishing the turning of a piece of steel in the chuck, in cutting off the piece so that it is square and true. If an ordinary square-nose tool is used, the chip is very likely to bind and score the work until it is unsatisfactory. Even a flood of oil will not always prevent this, and it is troublesome and wasteful. Or, again, the tool may stick so tight as to move the work in the chuck, marring and throwing it out of true, and not infrequently breaking the tool. Under the best conditions, chatter is always troublesome, so that in consideration of all these difficulties it not infrequently happens that the work is removed from the chuck and cut off by some other means, usually slow and inaccurate, and then "squared up" by still other means of a like nature.

It also happens frequently that work finished on the lathe centers involves cut-off troubles. If the piece is long or the cut taken far from either center, spring becomes serious and in any case the cut cannot go very deep without breaking unless a steady rest is used, which is not always possible. It is often a decided advantage to make two like parts in one piece and then cut them apart. When they are very short, the problem of driving the work is simplified and also when other conditions have to be met, such as a thin head on a pin. This method also saves extra centering and facing. Yet the trouble involved in cutting such pieces apart is often so great that all the advantages just named are sacrificed in order to avoid it. With a cut-off attachment, finished parts of almost any reasonable length can be cut apart on the lathe centers. Even without the supporting head, the cut may be taken far deeper than with a single tool, while with the head it can be taken almost to the center before the work breaks apart.

With the improved cut-off attachment used on such work, scoring, which is due to binding of the chip, is entirely avoided, even when little or no lubricant is used, leaving the surface true and straight; and the tool cannot stick or the work move in the chuck from any of the foregoing causes.

The improved cut-off attachment, as constructed according to the present invention, permits the straight and true cutting off of the work in an ordinary lathe more readily, more rapidly, more accurately, and with less dulling of the tool than has heretofore been possible. The above objects and advantages are also equally applicable to cases of work done on the centers.

In addition to the above, the present invention has numerous other objects and advantages, as will in part appear from the following detailed description, and in part understood by those skilled in this art.

In the accompanying drawings forming a part of this application, and in which similar reference symbols indicate corresponding parts in the several views.

Figures 1, 7, 8:
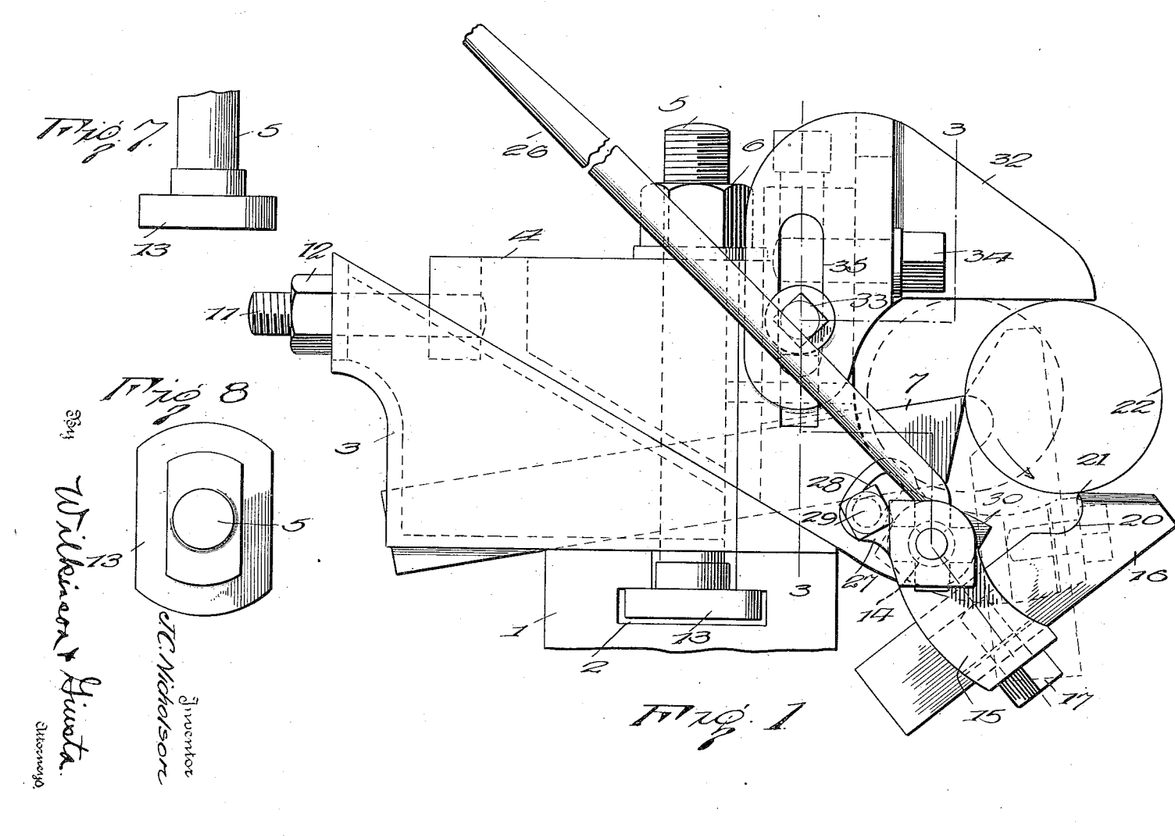
Figure 1 is a side elevational view of an improved lathe attachment constructed in accordance with the present invention.
Fig. 7 is a fragmentary view of the bolt for holding the device to the lathe cross-slide.
Fig. 8 is a plan view of the same.

Referring more particularly to the drawings, 1 in Fig. 1, represents the cross slide of the lathe which is provided with a slot 2 to receive the usual tool post.

Instead of placing the tool post on the cross-slide, however, according to the present invention, I make use of an improved attachment which is adapted to be removably carried by the cross-slide 1 and to be adjustable thereon, and which carries twin tools for operating upon the work at different angles.

The attachment consists of a lower wedge-shape member 3 and an upper companion wedge-shape member 4 adapted to slide one upon the other for effecting various adjustments which will be later apparent. A bolt 5 is made use of to hold the wedge members 3 and 4 together, the wedge members being slotted, as indicated in the plan view in Fig. 2, to receive such bolt 5 and to permit the wedge members 3 and 4 to move longitudinally without interference from such bolt 5. The bolt 5 carries a nut 6 by which the wedge members 3 and 4 may be held tightly together after adjustment.

Figures 2, 3, 4:
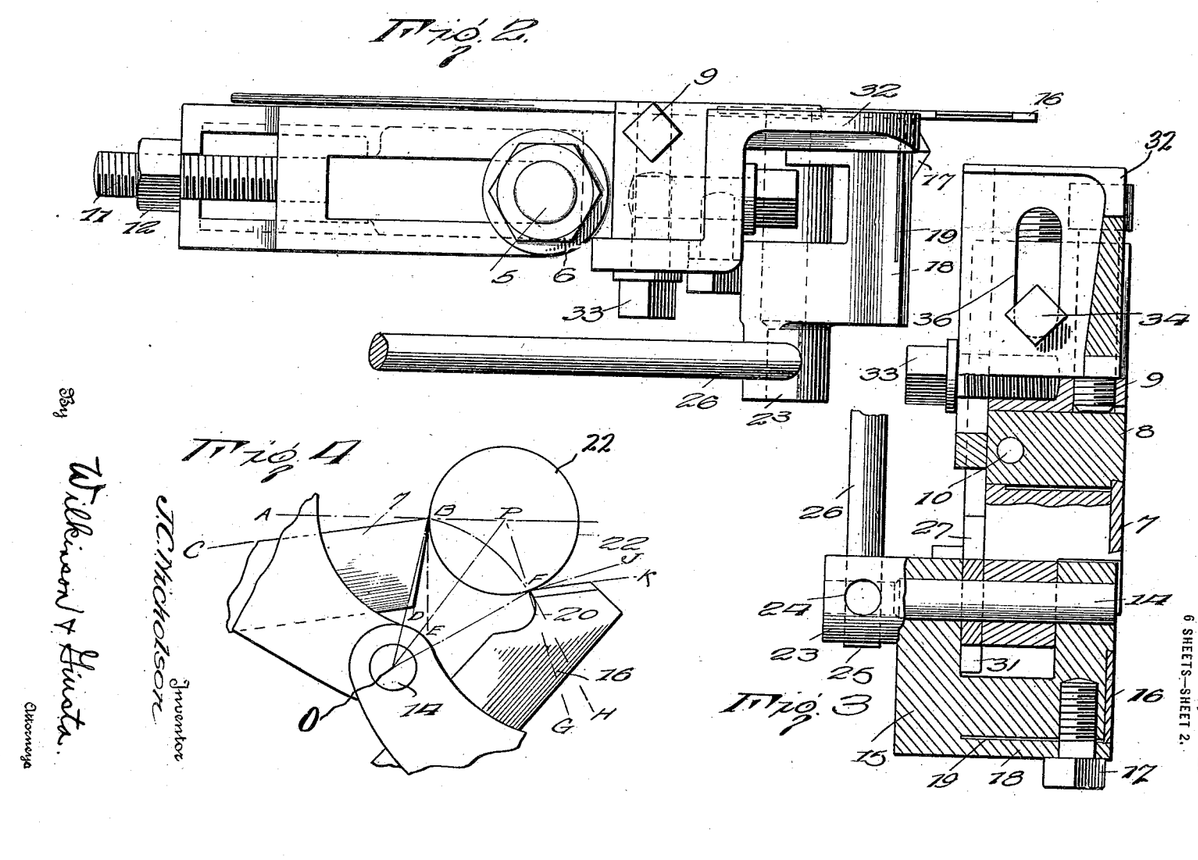
Fig. 2 is a top plan view thereof.
Fig. 3 is a vertical sectional view taken on the line 3—3 in Fig. 1.
Fig. 4 is a fragmentary diagrammatic view of the twin tools and the work showing the angles of rake and clearance thereof.

The wedge 4 carries the square nose tool 7 by the means preferably shown in Fig. 3, which consists of a block 8 held in place by a vertical screw 9 and a horizontal pin 10. To further assist in clamping the wedges 3 and 4 together a stud 11 is employed, which is threaded securely in wedge 4 and passes through a slot in wedge 3. The stud has run thereon a nut 12 for taking against the wedge 3 and binding the two wedges together. The adjustment of the wedge 4 on the companion wedge 3 secures vertical adjustment for the tool 7.

Figs. 7 and 8 show the head 13 of the bolt 5, and the manner in which the head is formed so as to adjust itself to slots of different proportions on the cross slides of lathes of different sizes and types, and which at the same time meets the requirement of great strength.

The lower end of the upper wedge 4 projects beyond the wedge 3 and the cross-slide 1 and carries a pin 14, on which is freely mounted a tool holder 15. The tool carried thereby is indicated at 16 and lies in a recess formed in one end wall thereof in the same plane with the square nose tool 7, as appears in Fig. 3. The tool 16 is shown clamped in the holder 15 by a screw 17 which is adapted to contract a portion 18 of the holder 15 which is made flexible by the formation of a slot 19 extending longitudinally of said holder, as clearly appears in Fig. 3. When the screw 17 is loosened the flexible portion 18 may be sprung out and the tool 16 released. As shown in Fig. 1, the tool 16 is adapted to engage the work from beneath and at substantially 90° from the point at which the square-nose tool 7 engages the same, and the form of the tool 16 employed is preferably that shown in Fig. 1, in which a notch 20 is ground in one edge of the tool next the work, and this notch is of such form as to produce a cutting point 21 which will present the desired angle against the work which is indicated at 22.

The tool holder 15 is extended at one side beyond the end of the pin 14 about which it rocks and forms a neck 23 having one or more perforations 24 therein adapted to be engaged by the bent end 25 of an operating handle or lever 26. The angular relation of the major portion of the handle or lever 26 to the bent end 25 is best seen in Fig. 1, although this angular relation may be varied wherever different requirements dictate. The angular end 25 is withdrawable from the perforations 24 in the neck 23 to allow the removal of the handle and its engagement with other perforations that may be produced in said neck 23, or to allow the opposed straight end of the lever to be inserted, where limited space for operation makes this an advantage.

A plate 27 has independent rocking movement about the pin 14 and is provided with a slot 28 engaged by a screw 29. A stop 30 carried by the plate 27 is adapted to be encountered by a shoulder 31 on the swinging tool holder 15 when the point 21 of the tool 16 approaches very close to the point of the square-nose tool 7, in order that the two tools may not meet to their injury or destruction when the work 22 is cut through. By the use of the slot 28 and set screw 29 the plate 27 may be set at any desired angular position to vary the position of the stop 30 and cause the arrest of the motion of the tool holder wherever desired.

By referring to Figs. 2 and 3 it will be seen that the tools 7 and 16 are mounted at one side of the improved lathe attachment so as to allow them to be brought very close to the lathe chuck, and thereby permitting the work to be cut off very close to said lathe chuck. It is often desirable, moreover, to cut off a piece of the work at a point overhung some distance from the chuck without supporting it with the tail center or steady rest, and this purpose is accomplished by means of a goose head 32 clamped to the upper wedge 4 by screws 33 and 34 in such manner as to make its lower edge parallel to the cross-slide, and it thereby acts as a steady rest bearing against the upper side of the rotating piece 22, thus carrying all the thrust in that direction. The slots 35 and 36 in the head 32 through which the screws 33 and 34 engage, permit of the vertical adjustment of the head 32 to accommodate work of large or small diameter.

The action of the form of the device just described is substantially as follows:—The cross-slide 1 is advanced toward the right, as indicated in Fig. 1, which feeds the square-nose tool 7 horizontally into the work 22, and this tool 7 acts in the usual manner to cut through the work 22 which is being rotated in the direction indicated by the arrow by the usual lathe driving mechanism. At the same time the cross-slide 1 is being moved toward the work the operative exerts pressure on the handle or lever 26 in a downward direction which causes the tool holder 15 to be swung in the counterclockwise direction as viewed from Fig. 1, about the pin 14, causing the tool 16 to be elevated into contact with the rotating work 22.

Suitable pressure is imposed on the lever or handle 26 to cause the V-shaped point 21 of the tool 16 to cut into the base of the groove in the work 22 slightly deeper than the square-nose tool 7, so that the chip formed by the latter may be split and caused to free itself from the groove, whereby the objectionable binding and consequent marring of the rotating work 22 cannot occur.

The direction of rotation of the work 22 as indicated by the arrow in Fig. 1, and the position at which the point 21 of the splitting tool 16 engages such work, will exert a tendency to draw the cross-slide 1 toward the right and feed the square-nose tool 7 into the work. Therefore in the use of the device the cross-slide 1 of the lathe may be made free to move, and its movement may be actually effected by simply exerting downward pressure on the handle 26 which will both move the splitting tool 16 into engagement with the work 22 and cause the cross-slide to feed the square-nose tool 7 into such work. This method of operation will insure the splitting tool 16 keeping a well defined V-shaped groove cut ahead of the square-nose tool 7, which is all important to prevent binding of the chip.

When the two tools 7 and 16 approach the center of the work, as shown by the dotted positions in Fig. 1, then the new position of point 21 acts as the fulcrum of a bent lever, whose load is substantially in horizontal movement at the pin 14 and whose power is applied on lever 26. At this time the rotating work tends to pull the tool 16 up, ceasing to have its original action, but now serving another purpose, namely, to prevent work mounted on the lathe centers from bending when reduced to small diameter by the two tools.

In order to fully appreciate the merits of the splitting tool 16 as it swings about the pin 14, a somewhat detailed reference to rake and clearance is necessary. The rake of any tool operating on a cylindrical surface is the angle between its cutting face and a line passing through the cutting point and the center of the rotating piece. And the clearance of any such tool is the angle of the face next to the work with a line tangent to the rotating piece at the cutting point. In Fig. 4, AB being a straight line and BE being perpendicular to it, the angle ABC is the rake of tool 7 and angle DBE is its clearance. Similarly, GP being a straight line and FJ being perpendicular to it and FH being the cutting face of tool 16 extended, angle GFH is the rake of tool 16 and angle KFJ its clearance. Both good work and other conditions require that these angles shall be properly chosen and then maintained constant as the tool feeds into the work. Rake and clearance are dependable on both the mounting and grinding of the tool, or upon one or the other. For instance in tool 7, the rake angle ABC is wholly dependent upon the mounting while the clearance angle DBE must be secured by proper grinding. But in tool 16 both these angles are got by grinding, though, of course, the mounting is made with due regard to them. Since the entire device carrying tool 7 is mounted on a cross-slide parallel to the line AP, it is clear that the rake angle ABC remains unchanged as the tool is fed into the work. It is perhaps clear enough without any explanation that in this tool and in any tool constant rake involves constant clearance and vice versa. In order that tool 16 may conform to this desired condition, it remains therefore to be shown by geometrical proof whether either of these angles is maintained constant. That the rake is constant may be shown as follows:

(1) For the same reason that angle ABC is constant, so also is angle OBP constant Angle OFP is proved constant as follows: OF and OB are equal because F must coincide with B when the tools meet. Draw OP. Then clearly triangle OBP is identical with triangle OFP and angle OFP equals angle OBP. But since angle OBP is constant, its equal angle OFP must also be constant.

(2) Since FH coincides with the fixed cutting face of tool 16, angle OFH is fixed by the construction and mounting of tool 16 independent of its position about pin 14 and is therefore constant. Also angle OFG, being a supplement of constant angle OFP, is likewise a constant. Constant angle OFH minus constant angle OFG leaves angle GFH, which is the rake of tool 16, a constant. Q. E. D.

Figure 5:
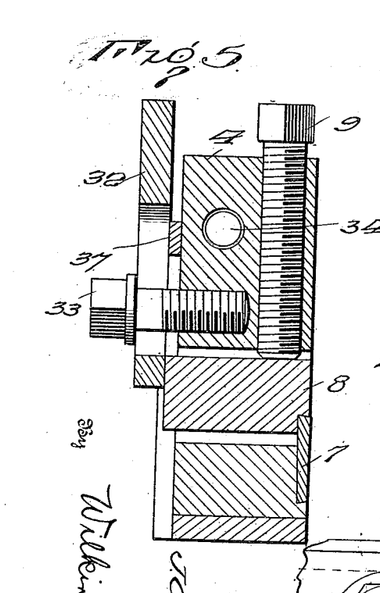
Fig. 5 is a vertical sectional view showing a slight modification.

Referring more particularly to Fig. 5, this is a view very similar to portions of Fig. 3, similar parts being similarly numbered in the two views; and the modification consists in dispensing with the pin 10 which holds the block 8 in place and forming such block 8 with a slotted projection 37 through which the screw 33 is adapted to take, whereby both the head 32 and the block 8 may be clamped to the wedge 4. By this means block 8 may be adjusted through a considerable range to allow tools of different widths to be used.

Figure 6:
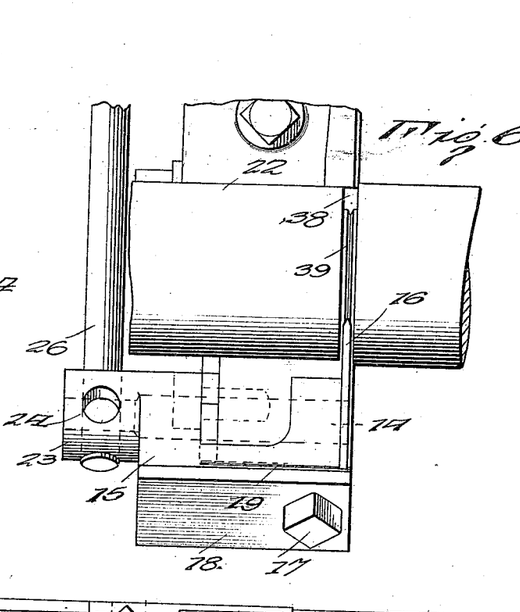
Fig. 6 is a front view of the improved device.

Fig. 6 shows the work 22 as having a groove 38 which is formed therein by the square-nose tool 7 and with a V formation in the base 39 of the groove produced by the splitting tool 16.

Figures 9, 19, 20, 21:
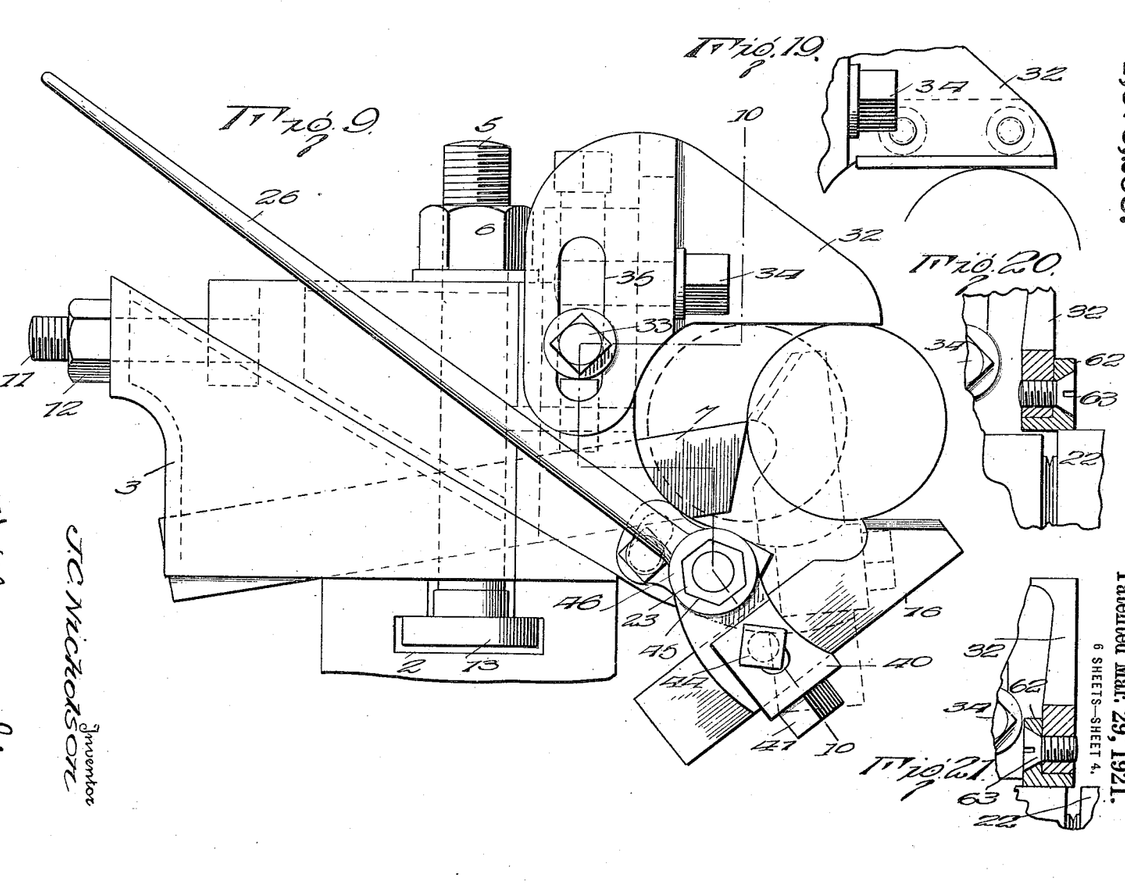
Fig. 9 is a side elevational view of a slightly modified form of the improved device.
Fig. 19 is a fragmentary view of a detail.
Fig. 20 is a sectional view taken vertically through Fig. 19, with parts shown in elevation and broken away.
Fig. 21 is a view similar to Fig. 20, with the part 62 interchanged.
Figure 10:
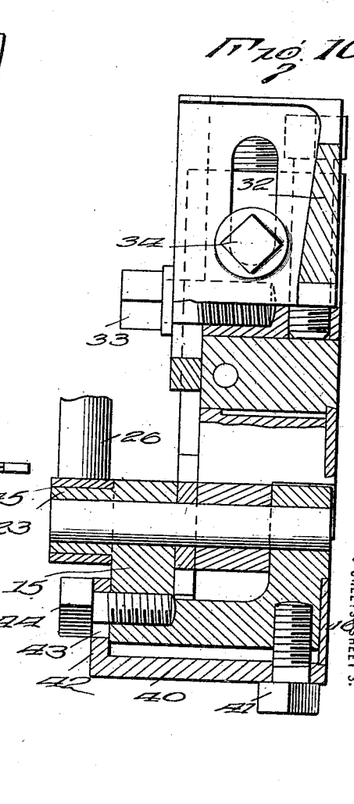
Fig. 10 is a vertical sectional view taken on the line 10—10 in Fig. 9.
Figure 11:
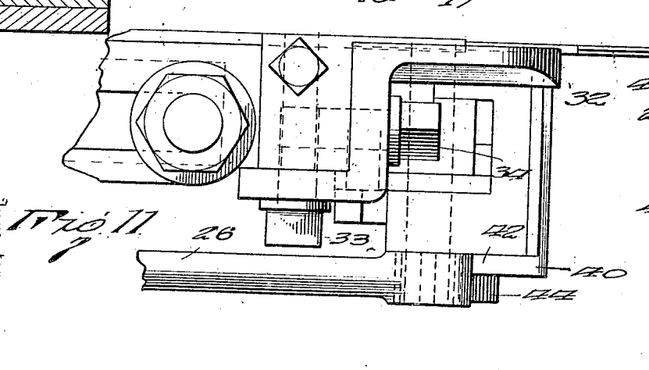
Fig. 11 is a fragmentary top plan view of the device shown in Fig. 9.

Figs. 9, 10 and 11 show a further slight modification of the improved device, but in the main this form is similar to the form first described, and like parts are designated by like numerals in the two forms, so that a repetition of the description is not thought necessary.

The form shown in Figs. 9, 10 and 11 differs from that first described in the construction of the tool holder 15 and the operating handle 26.

As shown in Fig. 10, the holder 15 is not formed with the slot 19, as shown in Fig. 3, but a separate clamp 40 is used which is adapted to engage the lower edge of the tool 16. A screw 41 holds the clamp 40 in engagement with the tool 16. The clamp has a lateral extension 42 slotted as indicated at 43 to receive a screw 44 threaded into the side of the tool holder 15, the slot allowing adjustment and the screw 44 holding the clamp in the adjusted position. The object here is to allow adjustment for tools of different widths.

The other difference resides in leaving the neck 23 free of perforations and forming the outer face thereof polygonal, as indicated at 45, and the handle or lever 26 is likewise formed with a head 46 having a polygonal socket therein adapted to fit the faces 45 of the neck 23. In this manner the handle may turn the tool holder 15.

Figures 12, 13, 16, 17, 18:
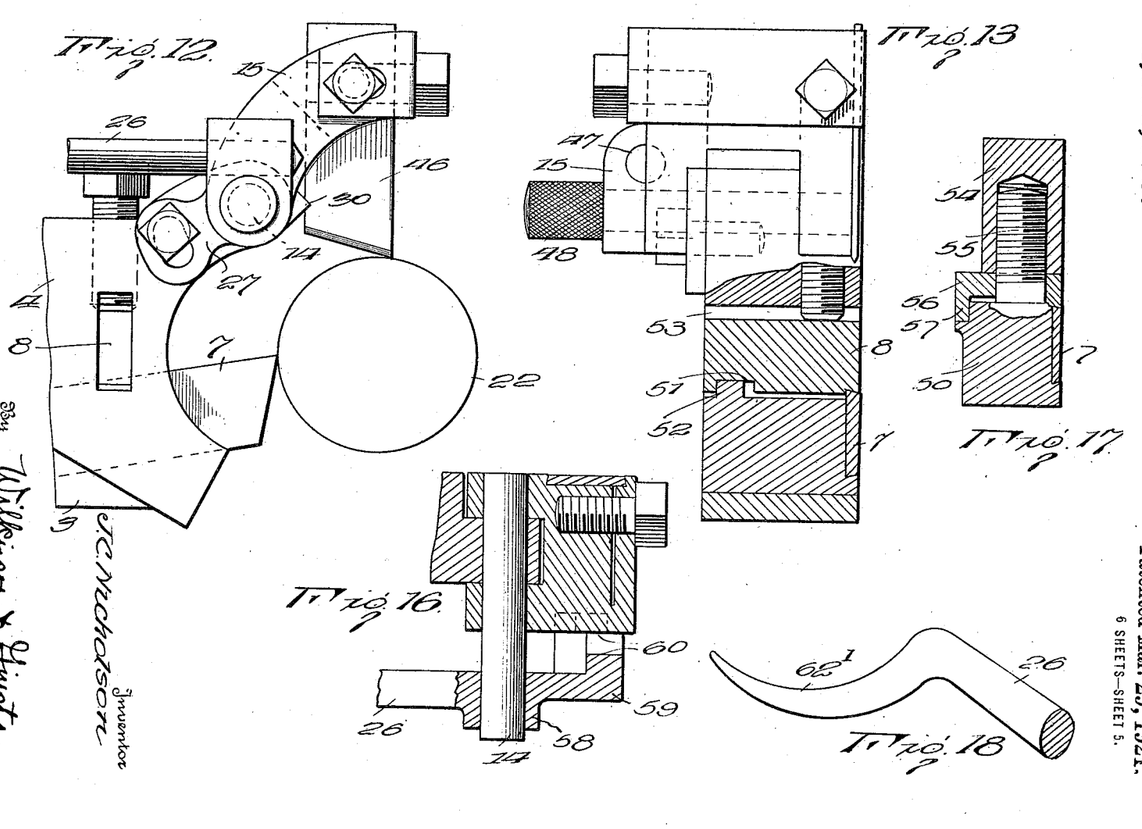
Fig. 12 is a fragmentary side elevational view of a still further modified form of the improved device.
Fig. 13 is an end view, with parts broken away, of the device shown in Fig. 12.
Fig. 16 is a fragmentary sectional view of a detail.
Fig. 17 is also a sectional view of a detail.
Fig. 18 is a fragmentary perspective view of the operating lever.

Referring now to Figs. 12 and 13, the arrangement is very similar to that shown in foregoing forms of the invention, except that instead of placing the swinging tool holder 15 below the work 22 it is placed above the same and is adapted to swing down about the pivot pin 14 to bring the splitting tool 16 into engagement with the work 22, for the purpose as already described.

The tool 46′ is of plain form instead of being notched, as heretofore shown. The operating lever or handle 26 is simply secured in a socket 47 in the swinging tool holder 15, as shown in Fig. 13, and the pin 14 is provided with the knurled head 48 projecting beyond the tool holder 15 to allow the same being easily withdrawn.

The block 8, for holding the tool 7, is provided in Fig. 13 with a notch 51 in its lower end adapted to receive an upstanding lug 52 on the wedge, and the slot 53 in which the block 8 fits is deep enough to allow the wedge to be slipped in above the lug 52, and thereafter the groove 51 is dropped over said lug.

Figures 14, 15:
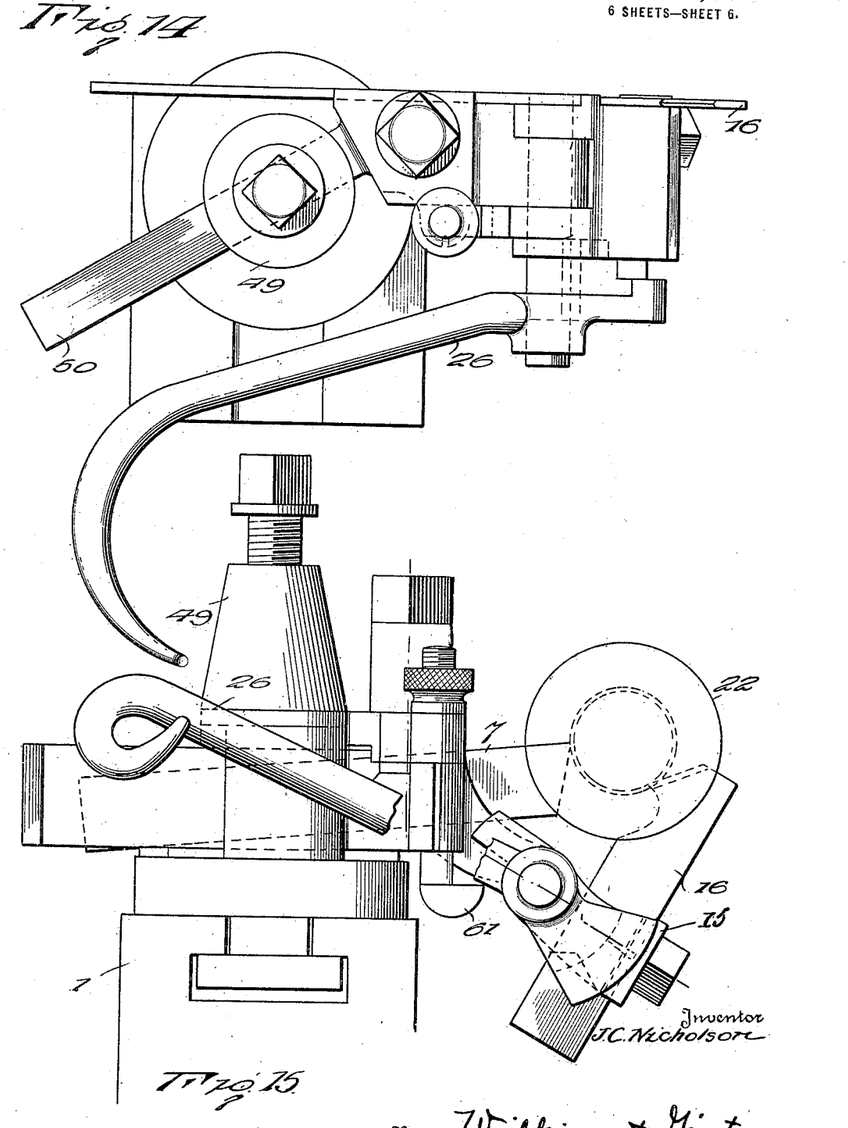
Fig. 14 is a plan view of a still further modified form of the improved device.
Fig. 15 is an elevational view of the same.

Referring now to Figs. 14 and 15, the lathe cross-slide 1 is adapted to receive the usual tool post 49 which is engaged with the slide in the ordinary manner. The holder 50 is of the offset type to allow the tool 7 to pass outside the tool post 49 and also to facilitate cutting off the work close to the lathe chuck. Horizontal and vertical adjustments are had in the ordinary way.

In Fig. 17 a means for holding the tool 7 is shown such as is used in conjunction with the form of the invention illustrated in Figs. 14 and 15. The holder of Figs. 14 and 15 is indicated at 50 and has a threaded projection 55 screwed into a cap 54 on a clamping plate 56, which in turn bears upon the upper edge of the tool 7. The part 56 has a ledge 57 which is farther from the center of the projection 55 than the part of the clamping plate that engages the tool 7, in order that most of the thrust may be carried by the tool 7 so as to hold it securely.

In Figs. 14, 15 and 16, a slightly different form of operating lever 26 is shown wherein the lever has a head 58 fitting loosely about the pin 14, and a segment 59 is formed on the head 58 at the opposite side to the handle 26, such segment 59 being provided with a series of stepped surfaces 60 which are adapted to be brought into engagement with the tool holder 15 in order to raise the splitting tool into contact with the work 22. The series of stepped surfaces allows the lever 26 to vary in position and to allow it to be moved in cramped places. A stop 61 is provided and is arranged to be adjusted in any suitable manner, and acts to arrest the movement of the tool holder in the same manner as described above with the stop parts 30 and 31.

In Fig. 18 the operating handle 26 is formed with a peculiarly shaped upper end 62' which is adapted to receive the arm of the operative whereby he may impose his weight upon such lever to get the desired pressure upon the splitting tool.

In Fig. 20 the head 32 is provided with a shoe 62 which may be hardened to take up the wear caused by the work 22 rotating in contact therewith. A cap screw 63 threaded into the head 32 is adapted to hold the hardened shoe 62 in place. This shoe is reversible, as shown in Fig. 21, so that it may have a bearing on that portion of the work which is next to the lathe chuck, or on that portion which is being cut off, as in this Fig. 21.

It is obvious that those skilled in the art may vary the details of construction and arrangements of parts without departing from the spirit of my invention, and therefore I do not wish to be limited to such features except as may be required by the claims.

I claim:

1. An attachment for lathes including a cutting tool, a splitting tool adapted to remove the chip from the groove cut by the cutting tool, means for advancing the splitting tool into the work whereby its angles of rake and clearance are constantly preserved, substantially as described.

2. An improved attachment for lathes including a cutting tool, a splitting tool for cutting a slot in the base of the groove cut by the cutting tool whereby to prevent binding of the chip in the groove, a swinging holder for said splitting tool, and means for swinging said holder to cause the splitting tool to feed into the work, substantially as described.

3. An improved attachment for lathes including a cutting tool, a splitting tool for cutting a slot in the base of the groove cut by the cutting tool whereby to prevent binding of the chip in the groove, a swinging holder for said splitting tool, and means for swinging said holder to cause the splitting tool to feed into the work, whereby the angles of rake and clearance of the splitting tool are at all times constant, substantially as described.

4. In a lathe, a cross-slide, a cutting tool, means whereby said cutting tool may be carried by said cross-slide, a splitting tool also carried by said cross-slide, and means whereby the splitting tool may be fed into the work, substantially as described.

5. An improved attachment for lathes having a cross-slide, a cutting tool, means whereby said cutting tool may be supported on said cross-slide, a splitting tool, means for hingedly supporting said splitting tool from said first named means, and a manual device for causing the splitting tool to be swung into the work under pressure, substantially as described.

6. An improved lathe attachment including a cutting tool, a movable splitting tool, means for advancing the splitting tool into the work, and stop means for preventing the two tools coming together, substantially as described.

7. An improved attachment for lathes including a cutting tool, a swinging splitting tool, means whereby an operative may cause the splitting tool to be swung into contact with the work under a desired pressure, and stop means for limiting the movement of said splitting tool, substantially as described.

8. An improved lathe attachment including a cutting tool, a splitting tool, a pivoted holder for said splitting tool, and a lever connected to said holder and adapted to be swung down to bring the cutting tool into contact with the work, substantially as described.

9. An improved lathe attachment including a cutting tool, a splitting tool, a pivotally mounted holder for said splitting tool, a lever whereby said holder may be rocked, and stop means for said holder, substantially as described.

10. An improved attachment for lathes including a cutting tool, a splitting tool, a pivotally mounted holder for said splitting tool, a lever for rocking said holder, and adjustable stop means for limiting the swinging movement of said holder, substantially as described.

11. An improved lathe attachment including a cutting tool, a splitting tool movable with respect to the cutting tool, means for advancing the splitting tool into the work, and means for supporting both said cutting and splitting tools and for securing vertical adjustment of the same simultaneously, substantially as described.

12. An improved lathe attachment including a cutting tool, a splitting tool adapted to remove the chip from the groove cut by the cutting tool, means for advancing the splitting tool into the work whereby its angles of rake and clearance are constantly preserved, means for supporting both said cutting and splitting tools and for admitting of the vertical adjustment of the same, and means engaging the work oppositely to said splitting tool to steady the same, substantially as described.

13. An improved attachment for lathes including a cutting tool, a splitting tool for cutting a slot in the base of the groove cut by the cutting tool, a swinging holder for said splitting tool, vertically adjustable supporting means for both said tools, and means whereby said splitting tool may be swung into the work under the desired pressure, substantially as described.

14. An improved lathe attachment including a cutting tool, a splitting tool for cutting a slot in the base of the groove cut by the cutting tool, a swinging holder for said splitting tool, supporting means for both said cutting and splitting tools, coacting supporting means whereby the first mentioned supporting means together with the tools may be adjusted vertically, means for swinging said holder and splitting tool under a desired pressure into the work, and a steady head engaging the work opposite to said splitting tool and also adjustably carried by said first mentioned supporting means, substantially as described.

15. An improved attachment for lathes including a cutting tool, means whereby said cutting tool may be carried by the lathe cross-slide, said means being capable of vertical adjustment, a splitting tool also supported by said first mentioned means and extending at an angle to said cutting tool, said splitting tool being movably mounted with respect to said cutting tool, and means for feeding the splitting tool into the work under the desired pressure, substantially as described.

16. An improved attachment for lathes comprising a cross-slide, a pair of superposed wedge members fitted upon said crossslide, means engaging said wedge members to hold the same adjustably on the slide and to secure the same together in any position of adjustment, a cutting tool carried by the upper wedge member, a swinging holder supported by the lower end of said upper wedge member, a splitting tool carried in said swinging holder and arranged at an angle to said cutting tool, means whereby said holder may be swung under a desired pressure to feed the splitting tool into the work, and a steady head also adjustably carried by said upper wedge member and engaging the work above the splitting tool, substantially as described.

17. In an attachment for lathes the combination of a cutting tool and a co-acting splitting tool, means for advancing both the cutting tool and the splitting tool into the work in said co-action whereby the angles of rake and clearance on both said tools are preserved constant.

18. In an attachment for lathes the combination of a cutting tool and a co-acting splitting tool, means for advancing both the cutting tool and the splitting tool into the work in said co-action whereby the angles of rake and clearance on both said tools are preserved, and a steadying device in operative relation to the cutting tool and the splitting tool.

19. An improved lathe attachment comprising supporting means adjustably mounted on the lathe, a swinging holder carried by said supporting means, a splitting tool supported in said holder, means for swinging said holder to feed the splitting tool into the work, swinging adjustable stop means associated with said holder and adapted to limit the swinging movement of the splitting tool, and a cutting tool adapted to operate on the work at an angle to said splitting tool, substantially as described.

20. A lathe attachment comprising a cross-slide, supporting means adjustably held on said cross-slide, a swinging holder mounted on said supporting means, a splitting tool removably carried by said holder, means whereby pressure may be applied to said holder and splitting tool, a stop plate pivoting about the fulcrum in said holder and having a part adapted to engage with said holder to limit the swinging movement thereof in one direction, means whereby said plate may be set, a cutting tool associated with said splitting tool and operating on the work in angular relation to the splitting tool, and an adjustable head extending against the work opposite to said splitting tool, substantially as described.

JAMES CALVIN NICHOLSON